(12) United States Patent
Okamura et al.

(10) Patent No.: US 9,452,608 B2
(45) Date of Patent: Sep. 27, 2016

(54) INK, INK CARTRIDGE AND INK JET RECORDING METHOD

(71) Applicant: CANON KABUSHIKI KAISHA, Tokyo (JP)

(72) Inventors: Daiji Okamura, Tokyo (JP); Kousuke Yamasaki, Kawasaki (JP); Kenichi Shiiba, Warabi (JP)

(73) Assignee: Canon Kabushiki Kaisha, Tokyo (JP)

(*) Notice: Subject to any disclaimer, the term of this patent is extended or adjusted under 35 U.S.C. 154(b) by 303 days.

(21) Appl. No.: 13/860,940

(22) Filed: Apr. 11, 2013

(65) Prior Publication Data
US 2013/0300804 A1    Nov. 14, 2013

(30) Foreign Application Priority Data

May 9, 2012    (JP) ................................. 2012-107783

(51) Int. Cl.
C09D 175/00    (2006.01)
B41J 2/175    (2006.01)
(Continued)

(52) U.S. Cl.
CPC .............. *B41J 2/17503* (2013.01); *B41J 2/05* (2013.01); *C09D 11/324* (2013.01); *C09D 11/38* (2013.01)

(58) Field of Classification Search
CPC ...... B41J 2/05; B41J 2/17503; B41J 2/2107; B41J 2/01; B41J 2/0057; B41J 2/1433; B41J 2/17; B41J 2/1755; B41J 2/17593; B41J 2/21; B41J 2/211; B41J 2/2114; B41J 2/2117; B41J 2/2056; B41J 11/0015; B41J 11/0002; B41J 3/60; C09D 11/324; C09D 11/38; C09D 11/005; C09D 11/30; C09D 11/32; C09D 11/322; C09D 11/328; C09D 11/36; C09D 11/40; C09D 11/52; C09D 11/54; C09D 11/101; C09D 11/00; C09D 175/00; C09D 175/04; C09D 175/08; B41M 5/0011; B41M 5/0017; B41M 5/52; B41M 5/5218; B41M 7/00; B41M 7/0072; B41M 7/0081; B41M 7/009
USPC ...... 347/56, 86, 95–105, 9–22, 88; 524/100, 524/101, 130, 291; 106/31.13, 31.27, 31.6, 106/31.85, 31.77; 523/160, 161
See application file for complete search history.

(56) References Cited

U.S. PATENT DOCUMENTS 7,144,452 B2    12/2006    Takayama et al.
7,160,372 B2    1/2007    Yoshizawa et al.
(Continued)

FOREIGN PATENT DOCUMENTS

CN    102395617 A    3/2012
EP    2 423 274 A1    2/2012
(Continued)

OTHER PUBLICATIONS

Jul. 31, 2013 European Search Report in European Patent Application No. 13002321.1.
(Continued)

*Primary Examiner* — Thinh Nguyen
(74) *Attorney, Agent, or Firm* — Fitzpatrick, Cella, Harper & Scinto (57) ABSTRACT

The invention provides an ink containing a polyurethane polymer which has units respectively derived from a polyisocyanate, a polyether polyol having no acid group and a diol having an acid group and has an acid value of 40 mg KOH/g or more and 140 mg KOH/g or less, a carbon black and at least one antioxidant selected from compounds represented by the general formulae (1) to (3).

18 Claims, 2 Drawing Sheets

(51) Int. Cl.
*C09D 11/324* (2014.01)
*C09D 11/38* (2014.01)
*B41J 2/05* (2006.01)

(56) References Cited

U.S. PATENT DOCUMENTS

| | | | |
|---|---|---|---|
| 7,198,664 B2 | 4/2007 | Mafune et al. | |
| 7,198,665 B2 | 4/2007 | Nakamura et al. | |
| 7,201,791 B2 | 4/2007 | Okamura et al. | |
| 7,247,194 B2 | 7/2007 | Okamura et al. | |
| 7,247,196 B2 | 7/2007 | Sato et al. | |
| 7,270,701 B2 | 9/2007 | Jinnou et al. | |
| 7,297,197 B2 | 11/2007 | Jinnou et al. | |
| 7,553,358 B2 | 6/2009 | Okamura et al. | |
| 7,566,362 B2 | 7/2009 | Mori et al. | |
| 7,611,571 B2 | 11/2009 | Yamashita et al. | |
| 7,618,484 B2 | 11/2009 | Fujimoto et al. | |
| 7,682,433 B2 | 3/2010 | Yanagimachi et al. | |
| 7,699,924 B2 | 4/2010 | Mafune et al. | |
| 7,868,060 B2 | 1/2011 | Sakai et al. | |
| 8,016,932 B2 | 9/2011 | Okamura et al. | |
| 8,029,612 B2 | 10/2011 | Ishii et al. | |
| 8,123,846 B2 | 2/2012 | Yamakami et al. | |
| 8,960,878 B2 * | 2/2015 | Ichinose | C09D 11/322 347/100 |
| 2007/0100024 A1 * | 5/2007 | Gu et al. | 523/160 |
| 2008/0291793 A1 * | 11/2008 | Ueda et al. | 369/47.14 |
| 2008/0292794 A1 * | 11/2008 | Sato et al. | 427/256 |
| 2010/0113687 A1 | 5/2010 | Schaefer et al. | |
| 2010/0124611 A1 | 5/2010 | Mayo et al. | |
| 2011/0102496 A1 | 5/2011 | Fukuda | |
| 2011/0143040 A1 | 6/2011 | Yamasaki et al. | |
| 2012/0256984 A1 | 10/2012 | Okamura et al. | |
| 2012/0268532 A1 * | 10/2012 | Mori et al. | 347/56 |
| 2013/0123426 A1 * | 5/2013 | Clarke | 524/871 |
| 2013/0300803 A1 * | 11/2013 | Shiiba et al. | 347/56 |
| 2013/0300805 A1 * | 11/2013 | Hakamada et al. | 347/56 |
| 2013/0300810 A1 * | 11/2013 | Nishino et al. | 347/86 |

FOREIGN PATENT DOCUMENTS

| | | |
|---|---|---|
| JP | 2009-287014 A | 12/2009 |
| JP | 2011-144354 A | 7/2011 |
| WO | 2011/074167 A1 | 6/2011 |
| WO | 2012/050142 A1 | 4/2012 |

OTHER PUBLICATIONS

Chinese Office Action dated May 21, 2014, issued in counterpart Chinese Application No. 201310168028.1, and English-language translation thereof.

* cited by examiner

INK, INK CARTRIDGE AND INK JET RECORDING METHOD

BACKGROUND OF THE INVENTION

1. Field of the Invention

The present invention relates to an ink jet ink, an ink cartridge having such an ink and an ink jet recording method using the ink.

2. Description of the Related Art

In order to improve the fastness of a resulting image, an ink to which a polyurethane polymer is added has heretofore been investigated (Patent Literature 1: Japanese Patent Application Laid-Open No. 2011-144354). Patent Literature 1 describes an ink containing a self-dispersion carbon black and a polyurethane polymer which contains a polyether polyol as a constituent component.

On the other hand, in order to improve the storage stability of an ink, an ink jet ink containing an antioxidant has been investigated (Patent Literature 2: Japanese Patent Application Laid-Open No. 2009-287014). Patent Literature 2 describes that 2,6-di-tert-butyl-p-cresol (BHT) which is a general-purpose antioxidant is contained in an ink containing a pigment and a compound having an ethylene oxide structure.

As a result of an investigation by the present inventors, it has been found that the ink containing the self-dispersion carbon black and the polyurethane polymer having the polyether polyol as a constituent unit causes a change in the fastness of the resulting image before and after long-term storage. Specifically, when the image was stored for a long period of time, the fastness of the image was lowered. Thus, BHT which is a general-purpose antioxidant was used in the ink described in Patent Literature 1 with reference to Patent Literature 2. As a result, the lowering of the fastness of the image when stored for a long period of time was inhibited. However, when this ink has was in an ink jet recording method in which an ink is ejected from a recording head by causing thermal energy to act on the ink, the ejection stability of the ink was low. When the recording was conducted at high speed in particular, the lowering of the ejection stability of the ink was marked.

SUMMARY OF THE INVENTION

Accordingly, it is an object of the present invention to provide an ink, by which the resulting image is excellent in fastness even when stored for a long period of time, and which has high ejection stability even when recording is conducted at high speed according to an ink jet recording method in which an ink is ejected from a recording head by the action of thermal energy. Another object of the present invention is to provide an ink cartridge having the above-described ink according to the present invention and an ink jet recording method using the ink according to the present invention.

The above objects can be achieved by the present invention described below. That is, the ink according to the present invention comprises a polyurethane polymer which has units respectively derived from a polyisocyanate, a polyether polyol having no acid group and a diol having an acid group and has an acid value of 40 mg KOH/g or more and 140 mg KOH/g or less, a carbon black and at least one antioxidant selected from compounds represented by the following general formulae (1) to (3):

General formula (1)

wherein $R_1$ is an alkyl group having 1 to 20 carbon atoms;

General formula (2)

wherein $R_2$ is a methylene group or an ethylene group; and

General formula (3)

wherein $R_3$ is an alkyl group having 1 to 16 carbon atoms.

According to the present invention, there can be provided an ink which provides an image with excellent fastness even when stored for a long period of time and has high-level ejection stability. In addition, according to another embodiment of the present invention, there can be provided an ink cartridge and an ink jet recording method using the above-described ink.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In general, a polyurethane polymer mainly has two segments of a hard segment composed of a polyisocyanate, a diol having an acid group, a chain extender and the like and a soft segment composed of a polyol having no acid group and the like. The hard segment contributes to strength, and the soft segment mainly contributes to flexibility. Both segments take a microphase separation structure, whereby a polyurethane polymer film can develop high elasticity having strength and flexibility in combination. Such film property participates in development of fastness of an image. On the other hand, the ejection stability of the ink containing the polyurethane polymer is related to the hydrophilicity of the polyurethane polymer.

There is a method of increasing the acid value of a polyurethane polymer for enhancing the hydrophilicity of the polyurethane polymer. The acid value of the polyurethane polymer depends on the amount of a unit derived from a compound having an acid group in the polyurethane polymer. Accordingly, in order to increase the acid value of the polyurethane polymer, it is necessary to increase the amount of a compound having an acid group used upon synthesis of the polyurethane polymer. Examples of a compound having an acid group which may be used upon the synthesis of the polyurethane polymer include (a) a polyol having an acid group and (b) a diol having an acid group.

General example of (a) the polyol having the acid group include acid-modified polyols such as carboxylic acid-modified polycaprolactone diol. However, it has been found that when a polyurethane polymer is synthesized by using only a polyol having an acid group as the compound having the acid group, the fastness of an image is lowered. This phenomenon has occurred even in the case where the acid value is low, that is, the case where the amount of the polyol having the acid group used is small, to say nothing of the case where the acid value is high. This is considered to be attributed to the situation that the polyurethane polymer synthesized by using the polyol having the acid group has the acid group in the soft segment thereof, so that a balance between strength and flexibility is broken. From the above, it has been found that even when the polyurethane polymer synthesized by using only the polyol having the acid group as the compound having the acid group is used in an ink, the ejection stability of the ink and the fastness of the image are not achieved at a high level.

On the other hand, examples of the diol having the acid group include dimethylolpropionic acid (hereinafter abbreviated as DMPA) and dimethylolbutanoic acid (hereinafter abbreviated as DMBA). When the amount of DMPA or DMBA used is increased for increasing the acid value of the resulting polyurethane polymer, the amount of a hydroxyl group also increases. It is thus necessary to relatively reduce the used amount of a polyol component having a hydroxyl group like DMPA or DMBA and reacting with an isocyanate with increasing amount of DMPA or DMBA used. As a result, the amount of the soft segment is reduced, and the flexibility is lowered, so that a polyurethane polymer film formed becomes very rigid, and the fastness of a resulting image is lowered. That is, it has been found that when a polyurethane polymer whose acid value has been increased by using a diol having an acid group is used in an ink, the ejection stability of an ink is improved, but the fastness of an image is lowered.

From the above-described investigation, the present inventors have found that it is necessary to design a polyurethane polymer by paying attention to two segment structures of a hard segment and a soft segment which are structures characteristic of the polyurethane polymer without controlling hydrophilicity/hydrophobicity of the polyurethane polymer by paying attention to the degree of its acid value for the purpose of achieving both ejection stability of an ink and fastness of an image at the same time.

The present inventors have carried out an investigation as to various polyurethane polymers in view of these results. As a result, it has been found that it is important to use a diol having an acid group as a compound having an acid group and used upon synthesis of a polyurethane polymer. In addition, the present inventors have come to the conclusion that it is important to control the acid value of the resulting polyurethane polymer to 40 mg KOH/g or more and 140 mg KOH/g or less by adjusting the used amount of the diol having the acid group and to use a polyether polyol having no acid group. The reason for this is described below in detail.

A polyester polyol, polyether polyol, polycarbonate diol or polycaprolactone polyol is generally used as a polyol upon synthesis of a polyurethane polymer. Among these, the polyether polyol has very high flexibility. Accordingly, even when a diol having an acid group is used upon the synthesis of the polyurethane polymer, a soft segment composed of the polyether polyol is hard to cause the lowering of flexibility by reduction of the soft segment. Therefore, sufficient flexibility can be retained even when the acid value is increased. An investigation by the present inventors has revealed that when the acid value of the polyurethane polymer is 140 mg KOH/g or less, flexibility can be sufficiently retained, and high fastness of an image can be achieved. On the other hand, if the acid value of the polyurethane polymer is less than 40 mg KOH/g, the ejection stability of the resulting ink becomes low. From the above, when the polyether polyol and the diol having the acid group are used, it is necessary to control the acid value of the resulting polyurethane polymer to 40 mg KOH/g or more and 140 mg KOH/g or less.

It has been found that the ejection stability of an ink and the fastness of an image can be markedly improved by using the polyurethane polymer of the constitution described above. However, an investigation by the present inventors has revealed that when an ink containing such a polyurethane polymer is stored for a long period of time, the fastness of a resulting image is lowered. The present inventor has investigated the reason for this in detail. As a result, it has been found that this is caused by lowering of the molecular weight of the polyurethane polymer due to cleavage of the ether linkage of the unit derived from the polyether polyol constituting the polyurethane polymer caused by dissolved oxygen in the ink, light and/or heat. Specifically, the present inventors presume that the lowering of the molecular weight of the polyurethane polymer is caused by the following mechanism. First, the ether linkage of the unit derived from the polyether polyol constituting the polyurethane polymer is oxidized into a peroxide by dissolved oxygen in the ink. At this time, a metal ion present in the ink exhibits a catalytic action, whereby the oxidation reaction is promoted. Since the peroxide produced by the oxidation reaction of the ether linkage is unstable, it is cleaved by light and/or heat to generate a radical. A decomposition reaction of a surrounding polyurethane polymer is further caused by this radical to generate a new radical. Such a radical-generating reaction is caused in a manner of a chain reaction, whereby the molecular weight of the polyurethane polymer in the ink is lowered.

Thus, the present inventors performed further investigation by using an antioxidant capable of capturing the radicals generated by the cleavage of the ether linkage or by the subsequent decomposition reaction in an ink, for inhibiting the lowering of the molecular weight of the polyurethane polymer upon long-term storage. As a result, the lowering of fastness of the image upon long-term storage has been inhibited. However, a black deposit (hereinafter also referred to as "kogation") has occurred on a heater board of a recording head when the ink has been used in an ink jet recording method in which an ink is ejected from the recording head by the action of thermal energy, so that the election stability of the ink may have been lowered in some cases. The present inventors have carried out an investigation as to this kogation in detail. As a result, it has been found that this kogation specifically occurs when a carbon black and an antioxidant are used in combination. The mechanism of the occurrence of this kogation is as follows.

When thermal energy is applied to ink, a part of a compound contributing to dispersion of the carbon black (a compound having a hydrophilic group or a polymer dispersant) is decomposed, and so the dispersed state of the carbon black is destabilized, and the carbon black aggregates. If an antioxidant is present in the ink at this time, a state in which the antioxidant is present in the aggregate of the carbon black is created because a part of the antioxidant is adsorbed on the carbon black by hydrophobic interaction. When thermal energy is applied to the ink in this state, the antioxidant that is apt to exhibit viscous properties by the thermal energy makes adhesion between the aggregated carbon black particles firm. As a result, it is considered that the firm carbon black aggregate deposits on the heater board of the recording head, and this becomes kogation to lower the ejection stability of the ink.

Thus, the present inventors have carried out an investigation as to an antioxidant capable of inhibiting the lowering of the molecular weight of the polyurethane polymer and preventing the occurrence of the kogation even when used together with carbon black. As a result, it has been revealed that compounds respectively represented by the following general formulae (1) to (3) are effective.

General formula (1)

wherein $R_1$ is an alkyl group having 1 to 20 carbon atoms;

General formula (2)

wherein $R_2$ is a methylene group or an ethylene group; and

General formula (3)

wherein $R_3$ is an alkyl group having 1 to 16 carbon atoms.

According to the investigation by the present inventors, the effect of the present invention has not been unable to be achieved even if any other compound whose structure is similar to the compounds represented by the following general formulae (1) to (3) is used.

The effect of the present invention can be achieved by the synergistic effect of the respective components like the above-described mechanism.

Ink:

The respective components constituting the ink according to the present invention will hereinafter be respectively described.

Polyurethane Polymer:

The polyurethane polymer used in the ink according to the present invention will now be described below.

Polyisocyanate

The term "polyisocyanate" in the present invention means a compound having two or more isocyanate groups. Specific examples of a polyisocyanate usable in the present invention include aliphatic polyisocyanates, alicyclic polyisocyanates, aromatic polyisocyanates and aromatic-aliphatic polyisocyanates. The proportion (% by mass) of a unit derived from the polyisocyanate in the polyurethane polymer is favorably 10% by mass or more and 80% by mass or less.

Examples of the aliphatic polyisocyanates include tetramethylenediisocyanate, dodecamethylenediisocyanate, hexamethylenediisocyanate, 2,2,4-trimethylhexamethylenediisocyanate, 2,4,4-trimethylhexamethylenediisocyanate, lysinediisocyanate, 2-methylpentane-1,5-diisocyanate and 3-methylpentane-1,5-diisocyanate. Examples of the alicyclic polyisocyanates include isophoronediisocyanate, hydrogenated xylylenediisocyanate, dicyclohexylmethane-4,4'-diisocyanate, 1,4-cyclohexanediisocyanate, methylcyclohexylenediisocyanate and 1,3-bis-(isocyanatomethyl)cyclohexane. Examples of the aromatic polyisocyanates include tolylenediisocyanate, 2,2'-diphenylmethanediisocyanate, 2,4'-diphenylmethane-diisocyanate, 4,4'-diphenylmethanediisocyanate, 4,4'-dibenzyldiisocyanate, 1,5-naphthylenediisocyanate, xylylenediisocyanate, 1,3-phenylenediisocyanate and 1,4-phenylenediisocyanate. Examples of the aromatic-aliphatic polyisocyanate include dialkyldiphenylmethanediisocyanates, tetraalkyldiphenylmethanediisocyanates and α,α,α,α-tetramethylxylylenediisocyanate. These polyisocyanates may be used either singly or in any combination thereof as needed. In the present invention, at least one selected from isophoronediisocyanate, hexamethylenediisocyanate and dicyclohexylmethane-4,4'-diisocyanate among the above-described polyisocyanates is favorably used.

Polyether Polyol Having No Acid Group

The polyurethane polymer used in the ink according to the present invention has a unit derived from a polyether polyol having no acid group. The proportion (% by mass) of the unit derived from the polyether polyol having no acid group in the polyurethane polymer is favorably 0.1% by mass or more and 80.0% by mass or less. The number-average molecular weight of the polyether polyol having no acid group as determined by GPC is favorably 450 or more and 4,000 or less in terms of polystyrene. Incidentally, another polyol having no acid group than the polyether polyol may be further used together with the polyether polyol having no acid group to synthesize the polyurethane polymer. In such a case, the proportion (% by mol) of the unit derived from the polyether polyol having no acid group in the units derived from all the polyols having no acid group in the polyurethane polymer is favorably 80 mol % or more and 100 mol % or less. Incidentally, a castor-oil-modified polyol is favorably not used from the viewpoint of ejection stability of a resulting ink.

Examples of the polyether polyol include polyalkylene glycols and addition polymers of, an alkylene oxide and a dihydric alcohol or a trihydric or still higher polyhydric alcohol. Examples of the polyalkylene glycols include polyethylene glycol, polypropylene glycol, polytetramethylene glycol, poly(1,2-butylene glycol), poly(1,3-butylene glycol) and ethylene glycol-propylene glycol copolymers. Examples of the dihydric alcohol include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane and 4,4'-dihydroxyphenylmethane. Examples of the trihydric or still higher polyhydric alcohol include glycerol, trimethylolpropane, 1,2,5-hexanetriol, 1,2,6-hexanetriol and pentaerythritol. Examples of the alkylene oxide include ethylene oxide, propylene oxide, butylene oxide and α-olefin oxides. These polyether polyols may be optionally used either singly or in any combination thereof as needed.

In the present invention, the polyether polyol having no acid group favorably includes at least one selected from polyethylene glycol, polypropylene glycol, poly(1,2-butylene glycol) and poly(1,3-butylene glycol). It has been confirmed that when these polyether polyols are used, the strength and flexibility of the resulting polyurethane polymer are improved, and the hydrophilicity thereof becomes high, so that the fastness of the resulting image and the ejection stability of ink are more improved. The proportion (% by mol) of units derived from polyethylene glycol, polypropylene glycol, poly(1,2-butylene glycol) and poly(1,3-butylene glycol) in all units derived from the polyether polyols in the polyurethane polymer is favorably 80 mol % or more and 100 mol % or less. In particular, the polyether polyol having no acid group more favorably includes polypropylene glycol. The reason for this is considered to be attributable to such an effect that when polypropylene glycol is used, a balance between strength and flexibility in the resulting polyurethane polymer film is improved.

Diol Having an Acid Group

The polyurethane polymer used in the ink according to the present invention has a unit derived from a diol having an acid group. In the present invention, the diol having the acid group means a diol having an acid group such as a carboxyl group, a sulfonic group or a phosphoric group. The diol having the acid group may also be present in the form of a salt with an alkali metal such as Li, Na or K, ammonia, or an organic amine such as dimethylamine. As the diol having the acid group, dimethylolpropionic acid or dimethylolbutanoic acid is favorably used. These compounds may be used either singly or in any combination thereof as needed. The proportion (% by mass) of a unit derived from the diol having the acid group in the polyurethane polymer is favorably 5.0% by mass or more and 40.0% by mass or less.

Chain Extender

In the present invention, a chain extender may also be used upon the synthesis of the polyurethane polymer. The chain extender is a compound reacting with a residual isocyanate group which has not formed a urethane linkage of the polyisocyanate unit in the polyurethane polymer. Examples of the chain extender include polyvalent amine compounds such as trimethylolmelamine and derivatives thereof, dimethylolurea and derivatives thereof, dimethylolethylamine, diethanol/methylamine, dipropanol-ethylamine, dibutanolmethylamine, ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine and hydrazine, polyamide-polyamine, and polyethylene-polyimine. Other examples thereof include ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol, 2-butyl-2-ethyl-1,3-propanediol, 1,4-cyclohexanediol, 1,4-cyclohexanedimethanol, hydrogenated bisphenol A, glycerol, trimethylolpropane and pentaerythritol. These chain extenders may be used either singly or in any combination thereof as needed.

Property of Polyurethane Polymer

In the present invention, the content (% by mass) of the polyurethane polymer is favorably 0.1% by mass or more and 10.0% by mass or less based on the total mass of the ink. If the content is less than 0.1% by mass, the effect to improve the fastness of the image may not be sufficiently achieved in some cases. If the content is more than 10.0% by mass on the other hand, the effect to improve the ejection stability of the ink may not be sufficiently achieved in some cases.

The content (% by mass) of the polyurethane polymer is favorably 0.05 times or more and 2.00 times or less in terms of mass ratio with respect to the content (% by mass) of a pigment based on the total mass of the ink. If the mass ratio is less than 0.05 times, the effect to improve the fastness of the image may not be sufficiently achieved in some cases. If the mass ratio is more than 2.00 times on the other hand, the effect to improve the ejection stability of the ink may not be sufficiently achieved in some cases.

The weight-average molecular weight (Mw) of the polyurethane polymer used in the ink according to the present invention as determined by GPC is favorably more than 30,000 and not more than 150,000 in terms of polystyrene. If the molecular weight is not more than 30,000, the strength of the polyurethane polymer becomes low, and the effect to improve the fastness of the image may not be sufficiently achieved in some cases. If the molecular weight is more than 150,000 on the other hand, the viscosity of the ink is apt to increase, and the effect to improve the ejection stability of the ink may not be sufficiently achieved in some cases.

Synthetic Process of Polyurethane Polymer

As a synthetic process of the polyurethane polymer in the present invention, any process heretofore generally used may be used. For example, the following process is mentioned. A polyisocyanate, a polyol having no acid group and a diol having an acid group are caused to react with one another, thereby synthesize a urethane prepolymer having an isocyanate group at a terminal of its molecule. Thereafter, an acid group in the urethane prepolymer is neutralized with a neutralizer. After this neutralized urethane prepolymer is then poured into an aqueous solution containing a chain extender to conduct a reaction, an organic solvent in the system is removed if contained, whereby the polyurethane polymer can be obtained.

Analysis Method of Polyurethane Polymer

The analysis of the polyurethane polymer may be conducted in a state of an ink. However, when the polyurethane polymer is extracted, precision of the analysis can be made higher. Specifically, a sample obtained by centrifuging ink at 80,000 rpm, subjecting the solution other than solid matter to acid precipitation with hydrochloric acid and drying the resultant deposit is used. Since the polyurethane polymer is contained in this sample, the composition, acid value and molecular weight of the polyurethane polymer can be analyzed according to the following respective methods by using this sample.

(1) Composition of Polyurethane Polymer

The composition (kinds of the polyisocyanate, the polyether polyol having no acid group and the diol having an acid group) of the polyurethane polymer can be identified by positions of peaks of chemical shifts obtained by dissolving the sample obtained above in deuterated dimethyl sulfoxide (deuterated DMSO) and subjecting the resultant solution to measurement by proton nuclear magnetic resonance ($^1$H-NMR) or carbon nuclear magnetic resonance ($^{13}$C-NMR), or by subjecting the sample obtained above to measurement by pyrolysis gas chromatography. The compositional ratio among the respective components can be calculated from the ratio among integrated values of the peaks of the respective chemical shifts. When the kind of the polyether polyol having no acid group is known in this manner, the number-average molecular weight thereof can be calculated.

(2) Measuring Method of Acid Value of Polyurethane Polymer

The acid value of the polyurethane polymer can be measured by a titrimetric method. In Examples which will be described subsequently, the acid value was measured by dissolving the polymer in THF and subjecting the resultant solution to potentiometric titration with an ethanol solution titrant of potassium hydroxide by means of a potentiometric automatic titrator AT510 (manufactured by KYOTO ELECTRONICS MANUFACTURING CO., LTD.).

(3) Measuring Method of Average Molecular Weight of Polyurethane Polymer The weight-average molecular weight of the polyurethane polymer can be measured by GPC. In Examples which will be described subsequently, the measurement by GPC was conducted by using an apparatus: Alliance GPC 2695 (manufactured by Waters), 4-successive columns: Shodex KF-806M (manufactured by Showa Denko) and a detector: RI (refractive index) to calculate the average molecular weight by using PS-1 and PS-2 (products of Polymer Laboratories) as polystyrene standard samples.

Compounds Represented by General Formulae (1) to (3):

The ink of the present invention contains at least one compound selected from compounds represented by the following general formulae (1) to (3):

General formula (1)

In the general formula (1), $R_1$ is an alkyl group having 1 to 20 carbon atoms. The alkyl group may be either linear or branched. In addition, $R_1$ is favorably an alkyl group having 5 to 10 carbon atoms. As the compound represented by the general formula (1), 4-[[4,6-bis(octylthio)-1,3,5-triazin-2-yl]amino]-2,6-di-tert-butylphenol (trade name: IRGANOX 565 (product of BASF); $R_1$ in the general formula (1) is $C_8H_{17}$) may be mentioned.

General formula (2)

In the general formula (2), $R_2$ is a methylene group or an ethylene group. As the compound represented by the general formula (2), 1,3,5-tris[[3,5-bis(1,1-dimethylethyl)-4-hydroxyphenyl]methyl]1,3,5-triazine-2,4,6(1H,3H,5H)-trione (trade name: IRGANOX 3114 (product of BASF); $R_2$ in the general formula (2) is a methylene group) may be mentioned.

General formula (3)

In the general formula (3), $R_3$ is an alkyl group having 1 to 16 carbon atoms. The alkyl group may be either linear or branched. In addition, $R_3$ is favorably a branched alkyl group having 7 to 9 carbon atoms. As the compound represented by the general formula (3), octyl-3,5-di-tert-butyl-4-hydroxy-hydrocinnamic acid (trade name: IRGANOX 1135 (product of BASF); $R_3$ in the general formula (3) is branched $C_8H_{17}$) may be mentioned.

The content (% by mass) of the compounds represented by the general formulae (1) to (3) is favorably $1.0 \times 10^{-4}$% by mass or more and $5.0 \times 10^{-1}$% by mass or less, more favorably $1.0 \times 10^{-3}$% by mass or more and $2.0 \times 10^{-1}$% by mass or less based on the total mass of the ink. If the content is less than $1.0 \times 10^{-4}$% by mass, the effect to improve the fastness of the image upon long-term storage may not be sufficiently achieved in some case. If the content is more than $5.0 \times 10^{-1}$% by mass, the effect to improve the ejection stability of the ink may not be sufficiently achieved in some cases.

The content (% by mass) of the compounds represented by the general formulae (1) to (3) based on the total mass of the ink is favorably $1.0 \times 10^{-3}$ times or more, and is further favorably $1.0 \times 10^{-1}$ times or less, particularly favorably $5.0 \times 10^{-3}$ times or more and $5.0 \times 10^{-2}$ times or less in terms of mass ratio with respect to the content (% by mass) of the polyurethane polymer. If the mass ratio is less than $5.0 \times 10^{-3}$ times, the effect to improve the fastness of the image upon long-term storage may not be sufficiently achieved in some case. If the mass ratio is more than $5.0 \times 10^{-2}$ times, the effect to improve the ejection stability of the ink may not be sufficiently achieved in some cases.

Analysis method of compounds represented by general formulae (1) to (3)

Whether the compounds represented by the general formulae (1) to (3) are contained in ink or not may be analyzed by the following method. Specifically, a sample obtained by centrifuging ink at 80,000 rpm, subjecting the solution other than solid matter to acid precipitation with hydrochloric acid and drying the resultant deposit is subjected to measurement by pyrolysis gas chromatography, whereby whether the compounds represented by the general formulae (1) to (3) are contained or not, and the structures thereof can be identified. In addition, the ratio between integrated values of peaks of chemical shifts of the compounds represented by the general formulae (1) to (3) and the polyurethane polymer is determined by dissolving the sample obtained above in deuterated DMSO and subjecting the resultant solution to measurement by carbon nuclear magnetic resonance ($^{13}$C-NMR), whereby the ratio between the contents of the compounds represented by the general formulae (1) to (3) and the polyurethane polymer can be calculated.

Carbon Black:

In the present invention, the content (% by mass) of carbon black in ink is favorably 0.1% by mass or more and 15.0% by mass or less, more favorably 1.0% by mass or more and 10.0% by mass or more based on the total mass of the ink.

In the present invention, the average particle size (average particle size $D_{50}$ based on volume) of a carbon black used in ink is favorably 50 nm or more and 150 nm or less. Incidentally, in Examples which will be described subsequently, Microtrac UPA-EX150 (manufactured by NIKKISO) was used to measure the average particle size of a pigment.

The carbon black used in the ink according to the present invention may be any of those heretofore generally used in an ink jet ink. Specific examples thereof include furnace black, acetylene black, channel black, thermal black and lamp black. More specifically, such commercially available carbon black as mentioned below may be used. Examples thereof include Raven: 7000, 5750, 5250, 5000 ULTRA, 3500, 2000, 1500, 1255, 1250, 1200, 1190 ULTRA-II and 1170 (all, products of Columbian); Monarch: 700, 800, 880, 900, 1000, 1100, 1300, 1400 and 2000 (all, products of Cabot); Black Pearls: 880, 800 and L (all, products of Cabot); Color Black: FW1, FW2, FW2V, FW18, FW200, S150, S160 and S170 (all, products of Degussa); Printex: 85, 95, 140U, U and V (all, products of Degussa); Special Black: 6, 5, 4A and 4 (all, products of Degussa AG); and No. 900, No. 1000 No. 2200B, No. 2300, No. 2350, No. 2400R and MCF-88 (all, products of MITSUBISHI CHEMICAL CORPORATION). Needless to say, a carbon black newly prepared for the present invention may also be used.

Dispersing Method of Carbon Black

In the present invention, specific examples of carbon black in terms of the dispersing method thereof include a polymer-dispersed type carbon black (a polymer-dispersed carbon black using a polymer dispersant and a microcapsule carbon black in which the surface of the carbon black particle is covered with a polymer) using a polymer as a dispersant, and a self-dispersion type carbon black (a hydrophilic-group-modified self-dispersion carbon black in which a hydrophilic group is bonded to the surface of the carbon black particle, and a polymer-bonded self-dispersion carbon black in which a polymer having a hydrophilic group is bonded to the surface of the carbon black particle) in which a hydrophilic group is bonded directly or through another atomic group to the surface of the carbon black particle. Needless to say, plural kinds of carbon blacks different in dispersing method may also be used in combination. In the present invention, the self-dispersion type carbon black is favorably used from the viewpoint of the effect to improve the fastness of the image upon long-term storage. The reason for this will now be described below in detail.

The self-dispersion type carbon black exhibits small steric hindrance compared with the polymer-dispersed type carbon black. Accordingly, when the self-dispersion type carbon black is contained together with the polyurethane polymer in an ink, a part of the polyurethane polymer can exist in the neighborhood of a pigment particle. In such an ink, the above-described radicals generated by the cleavage of the ether linkage or by the subsequent decomposition reaction react with the surface of the pigment particle, so that above-described radical-generating reaction is hard to occur in a chain reaction, whereby the lowering of the molecular weight of the polyurethane polymer upon long-term storage is inhibited. As a result, it is considered that the fastness of an image upon the long-term storage is improved.

When the polymer-dispersed type carbon black is used in the present invention, the polymer used as the dispersant favorably has both hydrophilic moiety and hydrophobic moiety. Specifically, examples thereof include acrylic polymers obtained by polymerizing a monomer having a carboxyl group, such as acrylic acid or methacrylic acid, and a monomer having an aromatic group, such as styrene. In the present invention, when the polymer-dispersed type carbon black is used in the present invention, the acid value of the polymer is favorably 90 mg KOH/g or more and 200 mg KOH/g or less. The weight-average molecular weight (Mw) of the polymer as determined by GPC is favorably 1,000 or more and 15,000 or less in terms of polystyrene. The content (% by mass) of the polymer in the ink is favorably 0.5% by mass or more and 5.0% by mass or less based on the total mass of the ink.

When the self-dispersion carbon black is used in the present invention, that with a hydrophilic group chemically bonded directly or through another atomic group (—R—) to the surface of carbon black may be used. Examples of the hydrophilic group include COOM, $SO_3M$, $PO_3HM$, $PO_3M_2$, $SO_2NH_2$ and $SO_2NHCOR$ groups. Incidentally, M in the above-mentioned formulae is a hydrogen atom, alkali metal, ammonium or organic ammonium. In the present invention, the hydrophilic group is favorably a phosphonic acid group such as $PO_3HM$ or $PO_3M_2$ from the viewpoint of the effect to improve the fastness of the image upon long-term storage. This is considered to be attributable to such an effect that the phosphonic acid group which may be present as a polyvalent anion in the ink attracts a metal ion which acts as a catalyst in the cleavage reaction of the ether linkage in the ink, thereby bringing about an effect to inhibit the cleavage reaction from being promoted. In particular, the phosphonic acid group more favorably has a structure of —$CQ(PO_3M_2)_2$. Q in the above formula is a hydrogen atom, R', OR', SR' or NR'$_2$, where R's are, independently of one another, a hydrogen atom, or an alkyl, acyl, aralkyl or aryl group. Specifically, examples of the alkyl group include methyl and ethyl groups, examples of the acyl group include acetyl and benzoyl groups, examples of the aralkyl group include a benzyl group, and examples of the aryl group include phenyl and naphthyl groups. Among these, —CH(PO$_3$M$_2$)$_2$ where R' is a hydrogen atom is particularly favorable in the present invention. Examples of another atomic group (—R—) include an amide group, an amino group, a ketone group, an ester group, an ether group, an alkylene group having 1 to 12 carbon atoms, a substituted or unsubstituted phenylene group and a substituted or unsubstituted naphthylene group. In the present invention, —R— favorably contains —C$_6$H$_4$—CONH— (benzamide structure).

In addition, an investigation by the present inventors has revealed that when the surface charge amount of a self-dispersion pigment in which a phosphonic acid group is bonded directly or through another atomic group to the surface thereof is 0.25 mmol/g or more and 0.42 mmol/g or less, the effect to inhibit the lowering of the molecular weight of the polyurethane polymer upon the long-term storage is more markedly achieved, and moreover the dispersion stability of the pigment upon the long-term storage is improved to inhibit the pigment from aggregating. If the surface charge amount is less than 0.25 mmol/g, the dispersion stability of the pigment may become insufficient in some cases. If the surface charge amount is more than 0.42 mmol/g on the other hand, the effect to improve the fastness of the image upon the long-term storage may not be sufficiently achieved in some cases though the dispersion stability of the pigment is improved.

Analysis Method of Pigment

A method for verifying whether a pigment contained in an ink is of a self-dispersion type or not is as follows. Specifically, after ink is subjected to acid precipitation, centrifugation is conducted to collect a precipitate. In the case of a pigment dispersion, the pigment dispersion is subjected to acid precipitation to collect a precipitate. The precipitate collected is placed in a Petri dish, water is poured therein, and stirring is conducted to re-disperse the precipitate. When a precipitate does not occur in the Petri dish after the resultant dispersion is left to stand for one day, and the pigment is dispersed, the pigment contained in the ink is determined to be a self-dispersion type pigment.

When the carbon black contained in ink is of a self-dispersion type, whether the hydrophilic group thereof is a phosphonic acid group or not can be verified by an ICP emission spectrometer. Specifically, when a phosphorus atom is identified by using the ICP emission spectrometer, the self-dispersion carbon black is judged to have a phosphonic acid group.

In the present invention, the surface charge amount of the carbon black is determined by colloid titration. In Examples which will be described subsequently, a potentiometric automatic titrator (AT-510, manufactured by KYOTO ELECTRONICS MANUFACTURING CO., LTD.) with a flow potential titration unit (PCD-500) installed therein was used to measure the surface charge amount of a pigment in a pigment dispersion liquid. At that time, methyl glycol chitosan was used as a titrant. Incidentally, of course, the measurement of the surface charge amount may be conducted by using a pigment extracted from an ink by a proper method. In addition, the concentration of the pigment in the ink may also be adjusted with water as needed.

Acrylic Polymer:

The ink according to the present invention favorably further contains an acrylic polymer from the viewpoint of the ejection stability of the ink. Incidentally, "(meth)acrylic acid" and "(meth)acrylate" which will hereinafter be described indicate "acrylic acid, methacrylic acid" and "acrylate, methacrylate", respectively.

In the present invention, the antioxidant exhibits viscous properties by thermal energy, thereby making adhesion between aggregated carbon black particles firm, and consequently the ejection stability of the ink is lowered, as described above. However, since the polyurethane polymer itself has some viscosity, the polyurethane polymer also has an effect to allow the aggregated carbon black particles to stick together. The reason for this is that since the polyurethane polymer has strong intermolecular interaction owing to a hydrogen bond between a hydrogen atom and a nitrogen atom, its viscosity is very high. An investigation by the present inventors has revealed that when an acrylic polymer is caused to be further contained in such an ink, the deposit of the carbon black physically adsorbs not only the polyurethane polymer, but also the acrylic polymer having low viscosity compared with the polyurethane polymer, so that the effect to allow the carbon black particles to stick together by the polyurethane polymer is weakened to improve the ejection stability of the ink. Accordingly, the acrylic polymer is favorably further used in the present invention.

In the present invention, "acrylic polymer" is a polymer obtained by using (meth)acrylic acid or an alkyl(meth)acrylate as a monomer. In the present invention, the polymer may also be a copolymer of (meth)acrylic acid or an alkyl(meth)acrylate and another monomer. As another monomer copolymerized with (meth)acrylic acid or an alkyl(meth)acrylate, any publicly known monomer may be used. Among others, however, an α,β-ethylenically unsaturated compound having an aryl group, such as styrene, α-methylstyrene, vinyl phenylacetate, benzyl(meth)acrylate or 2-phenoxyethyl(meth)acrylate, is favorable. When the acrylic polymer is a copolymer, the copolymer may be either a random copolymer or a block copolymer. In the present invention, a copolymer of (meth)acrylic acid, an alkyl(meth)acrylate and styrene is more favorably used.

In the present invention, the acid value of the acrylic polymer is favorably 100 mg KOH/g or more and 200 mg KOH/g or less. The acid value of the acrylic polymer was measured according to the same method as in the measurement of the acid value of the polyurethane polymer. The weight-average molecular weight (Mw) of the acrylic polymer as determined by GPC is favorably 3,000 or more and 10,000 or less in terms of polystyrene. The weight-average molecular weight of the acrylic polymer was measured according to the same method as in the measurement of the weight-average molecular weight of the polyurethane polymer. The content (% by mass) of the acrylic polymer is favorably 0.5% by mass or more and 3.0% by mass or less, more favorably 1.0% by mass or more and 2.4% by mass or less based on the total mass of the ink.

The content (% by mass) of the acrylic polymer is favorably 0.5 times or more and 2.0 times or less in terms of mass ratio with respect to the content (% by mass) of the polyurethane polymer based on the total mass of the ink. When the content of the acrylic polymer falls within this range, the effect to lower the viscosity of the polyurethane polymer by the acrylic polymer is more effectively developed. If the mass ratio is less than 0.5 times, the effect to improve the ejection stability of the ink may not be sufficiently achieved in some cases. If the mass ratio is more than 2.0 times on the other hand, the effect to improve the fastness of the image may not be sufficiently achieved in some cases.

Water-Soluble Organic Compound:

The ink according to the present invention may contain a water-soluble organic compound. The content (% by mass) of the water-soluble organic compound in the ink is favorably 3.0% by mass or more and 50.0% by mass or less based on the total mass of the ink. The water-soluble organic compound may be that which is solid or liquid at ordinary temperature, and any compound heretofore generally used may be used. Examples thereof include alcohols, glycols, alkylene glycols the alkylene group of which has 2 to 6 carbon atoms, polyethylene glycols, nitrogen-containing compounds, and sulfur-containing compounds. These water-soluble organic compounds may be used either singly or in any combination thereof as needed. In the present invention, polyethylene glycol among the water-soluble organic compounds is favorably used.

Polyethylene Glycol

An investigation by the present inventors has revealed that when the ink further contains polyethylene glycol, the effect to allow the carbon black particles to stick together by the polyurethane polymer is weakened to improve the ejection stability of the ink. The reason for this is that an oxygen atom in the polyethylene glycol is hydrogen-bonded to a hydrogen atom in the polyurethane polymer, whereby the intermolecular interaction of the polyurethane polymer is weakened to lower the viscosity of the polyurethane polymer. Accordingly, polyethylene glycol is favorably further used in the present invention.

In the present invention, the content (% by mass) of polyethylene glycol in the ink is favorably 0.1 times or more and 2.0 times or less in terms of mass ratio with respect to the content (% by mass) of the polyurethane polymer based on the total mass of the ink from the viewpoint of the ejection stability of the ink. The number-average molecular weight of polyethylene glycol is favorably 500 or more and 3,000 or less. The number-average molecular weight of polyethylene glycol is measured by centrifuging ink to collect a supernatant liquid thereof, drying the supernatant liquid, dissolving the resultant dried product in deuterated DMSO and then subjecting the resultant solution to measurement by carbon nuclear magnetic resonance ($^{13}$C-NMR), thereby calculating the number of repeating units of polyethylene glycol.

Water:

The ink according to the present invention may contain water. Deionized water (ion-exchanged water) is favorably used as water. The content (% by mass) of water in the ink is favorably 50.0% by mass or more and 95.0% by mass or less based on the total mass of the ink.

Other Components:

The ink according to the present invention may also contain a water-soluble organic compound that is solid at ordinary temperature, such as a polyhydric alcohol such as trimethylolpropane or trimethylolethane, urea, or a urea derivative such as ethyleneurea in addition to the above-described components, as needed. Further, the ink according to the present invention may also contain various additives such as a surfactant, a pH adjustor, a rust preventive, a preservative, a mildewproofing agent, an anti-reducing agent, an evaporation accelerator, a chelating agent, another antioxidant than the compounds represented by the general formulae (1) to (3), and another polymer than the polyurethane polymer, as needed.

Ink Cartridge:

The ink cartridge according to the present invention has an ink storage portion storing an ink, and the ink according to the present invention is stored in the ink storage portion. The structure of the ink cartridge is such that the ink storage portion is formed by an ink storage chamber storing a liquid ink and a negative pressure generating member storage chamber storing a negative pressure generating member holding the ink in the interior thereof by a negative pressure. The ink storage portion of the ink cartridge may also be so constructed that the whole amount of the ink stored is held in the negative pressure generating member without providing the ink storage chamber storing the liquid ink. In addition, the ink cartridge may be constructed so as to have an ink storage portion and a recording head.

Ink Jet Recording Method:

The ink jet recording method according to the present invention is an ink jet recording method in which thermal energy is caused to act on an ink to eject the ink from a recording head, and the ink according to the present invention is used. Incidentally, "recording" in the present invention include a mode of conducting recording on a recording medium with the ink according to the present invention and a mode of conducting printing on a non-permeable base material such as glass, plastic or film with the ink according to the present invention. Examples of the recording medium include plain paper and what is called glossy paper provided with a porous ink receiving layer containing an inorganic pigment and a binder on a gas-permeable support (for example, paper). In the present invention, recording is favorably conducted on plain paper with the ink according to the present invention because the effect of the present invention is particularly exhibited.

Figure 1:
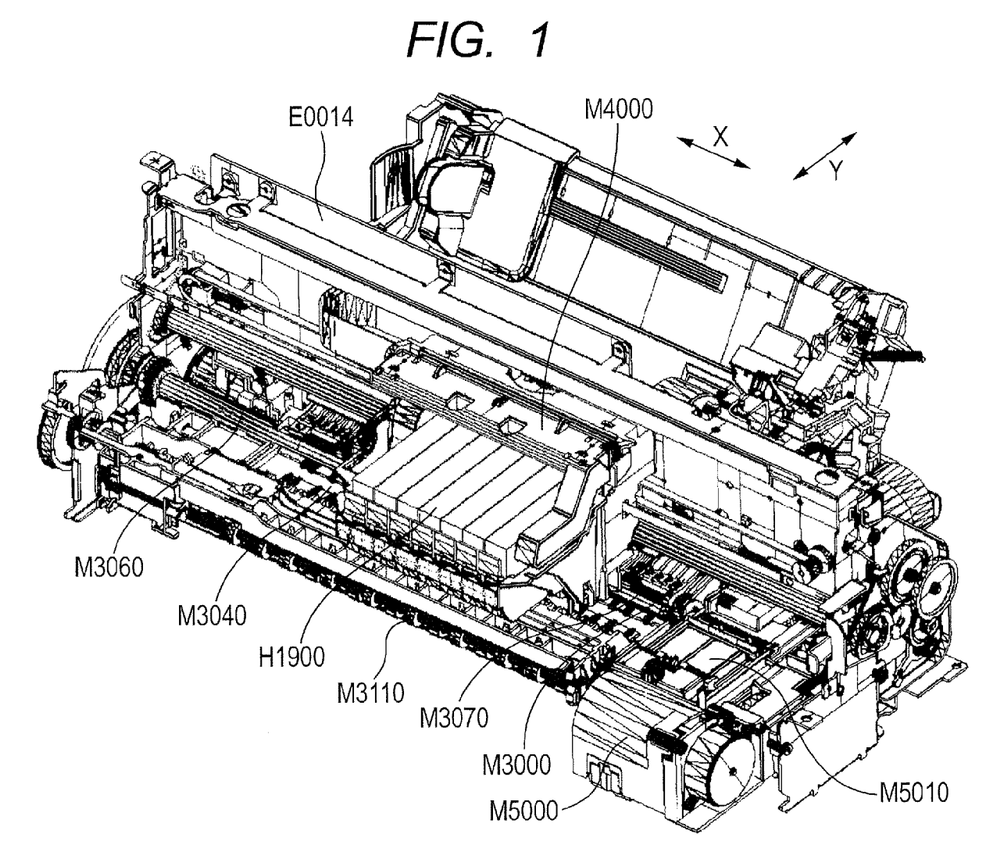
FIG. 1 is a perspective view illustrating a mechanism portion of an ink jet recording apparatus.

FIG. 1 is a perspective view illustrating a mechanism portion of an ink jet recording apparatus. Upon feeding of paper, only a predetermined number of recording media is sent to a nip portion constructed by a paper feed roller and a separating roller in a paper feeding portion including a paper feeding tray. The recording media are separated in the nip portion, and only a recording medium located uppermost is conveyed. The recording medium sent to a conveying portion is guided to a pinch roller holder M3000 and a paper guide flapper and sent to a pair of rollers of a conveying roller M3060 and a pinch roller M3070. The pair of rollers composed of the conveying roller M3060 and the pinch roller M3070 are rotated by driving of an LF motor, and the recording medium is conveyed on a platen M3040 by this rotation.

Upon forming of an image, a recording head is arranged at an intended image forming position in a carriage portion, and an ink is ejected on the recording medium according to a signal from an electric substrate. While conducting recording by a recording head in the ink jet recording apparatus, main scanning in which a carriage M4000 scans in a column direction and secondary scanning in which the conveying roller M3060 conveys the recording medium in a row direction are alternately repeated, thereby forming an image on the recording medium. The recording medium, on which the image has been formed, is nipped between a first paper discharging roller M3110 and a spur in a paper discharging portion, conveyed and finally discharged on a paper discharging tray.

Figure 2:
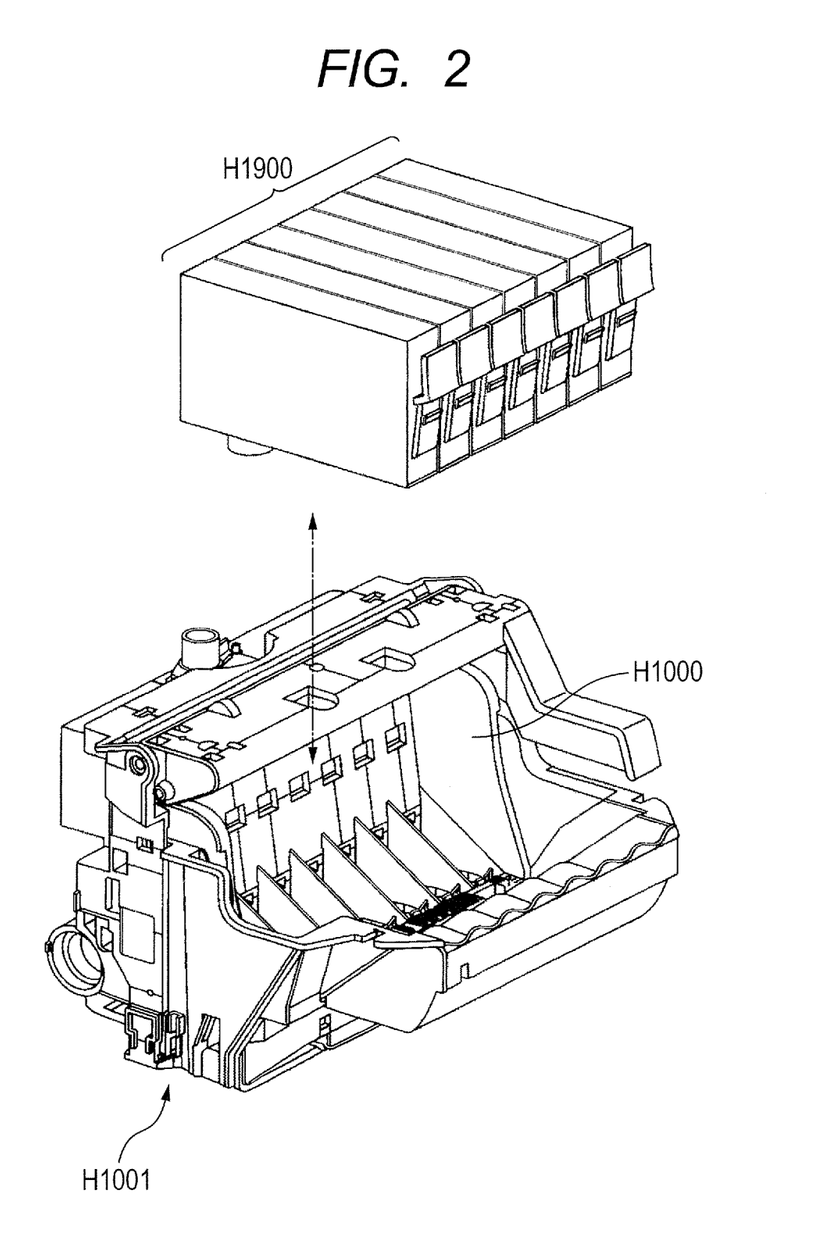
FIG. 2 is a perspective view illustrating a state in which an ink cartridge is installed in a head cartridge.

FIG. 2 is a perspective view illustrating a state in which an ink cartridge H1900 is installed in a head cartridge H1000. The ink jet recording apparatus according to this embodiment forms an image with respective inks of yellow, magenta, cyan, black, light magenta, light cyan and green.

Accordingly, ink cartridges H1900 for seven colors are independently provided. The ink according to the present invention is used as at least one ink of the inks described above. As illustrated in FIG. 2, each ink cartridge H1900 is detachably installed in the head cartridge H1000. Incidentally, the ink cartridge H1900 can be detachably installed in a state in which the head cartridge H1000 has been installed in the carriage M4000.

The present invention will hereinafter be described in more detail by the following Examples and Comparative Examples. However, the present invention is not limited by the following examples unless going beyond the gist of the present invention. Incidentally, all designations of "part" or "parts" described in the following examples are based on mass unless expressly noted.

Preparation of Pigment Dispersion:

Preparation of Pigment Dispersion A

A styrene-acrylic acid copolymer having an acid value of 200 mg KOH/g and a weight-average molecular weight of 10,000 was neutralized with a 10% by mass aqueous potassium hydroxide solution. Ten parts of a carbon black having a specific surface area of 210 m$^2$/g and a DBP oil absorption of 74 ml/100 g, 20 parts of the neutralized styrene-acrylic acid copolymer and 70 parts of water were mixed. After this mixture was dispersed for 1 hour by means of a sand grinder, a centrifugal treatment was conducted to remove coarse particles, and the thus-treated mixture was filtered under pressure through a microfilter (product of Fuji Photo Film Co., Ltd.) having a pore size of 3.0 μm. Pigment Dispersion A in a state in which the carbon black had been dispersed in water by the polymer was obtained by the above-described process. The content of the pigment in Pigment Dispersion A was 10.0% by mass, the pH of the dispersion was 10.0, and the average particle size of the pigment was 120 nm.

Preparation of Pigment Dispersion B

In a state of being cooled to 5° C., 8.28 mmol of 4-amino-phthalic acid was added into a solution with 60 mmol of concentrated hydrochloric acid dissolved in 5.5 g of water. A container containing this solution was then placed in an ice bath, thereby constantly keeping the solution at a temperature not higher than 10° C. In this state, a solution with 21.2 mmol of sodium nitrite dissolved in 9 g of water at 5° C. was added into this solution. After this solution was stirred additionally for 15 minutes, 6 g of Black Pearls 880 (product of Cabot) having a specific surface area of 220 m$^2$/g was added under stirring. Thereafter, the stirring was conducted additionally for 15 minutes, the resultant slurry was filtered through filter paper (trade name: Toyo Filter Paper No. 2; product of Advantec), and the resultant particle was fully washed with water. This particle was dried in an oven controlled to 110° C. to prepare a self-dispersion carbon black. In addition, water was added to the resultant self-dispersion carbon black, the pH of the resultant mixture was adjusted to 10.0 with an aqueous potassium hydroxide solution, and the pigment was dispersed in such a manner that the content of the pigment is 10.0% by mass, thereby preparing a dispersion liquid. By the above-described process, Pigment Dispersion B in a state in which self-dispersion carbon black in which a phthalic acid group whose counter ion was potassium was bonded to the surface of the carbon black particle was dispersed in water was obtained. Incidentally, the content of the pigment in the Pigment Dispersion B prepared above was 10.0% by mass, the pH thereof was 10.0, and the average particle size of the pigment was 120 nm. In addition, the surface charge amount of the pigment as measured by the above-described method was 0.34 mmol/g.

Preparation of Pigment Dispersion C

A reaction vessel was charged with 500 g of a carbon black having a specific surface area of 220 m$^2$/g and a DBP oil absorption of 112 ml/100 g, 45 g of aminophenyl(2-sulfoethyl) sulfone and 900 g of distilled water, and the contents were stirred for 20 minutes at a temperature of 55° C. and 300 rpm. Thereafter, 40 g of 25% by mass sodium nitrite was added dropwise over 15 minutes, and 50 g of distilled water was further added to conduct a reaction for 2 hours at 60° C. The resultant reaction product was taken out while diluting with distilled water and adjusted in such a manner that the solid content is 15.0% by mass. In addition, a centrifugal treatment and a purifying treatment were conducted to remove impurities, thereby obtaining a dispersion liquid (1). The carbon black in the dispersion liquid (1) was in a state in which a functional group of aminophenyl (2-sulfoethyl) sulfone was bonded to the surface thereof. The moles of the functional group bonded to the carbon black in this dispersion liquid (1) was determined in the following manner. The sodium ion in the dispersion liquid (1) was measured by a probe type sodium electrode, and the resultant value was converted to a value per carbon black powder to determine the number of moles of the functional group bonded to the carbon black. The dispersion liquid (1) was then added dropwise into a solution of pentaethylenehexamine. In this case, the solution of pentaethylenehexamine was kept at room temperature while strongly stirring, and the dispersion liquid (1) was added dropwise over 1 hour. At this time, the content of pentaethylenehexamine was set to be 1 to 10 times of the moles of the sodium ion measured above, and the amount of the solution was set to be equal to the dispersion liquid (1). After this mixture was stirred additionally for 18 to 48 hours, a purifying treatment was conducted to obtain a dispersion liquid (2) having a solid content of 10.0% by mass. The carbon black in the dispersion liquid (2) was in a state in which pentaethylenehexamine was bonded to the surface thereof.

A styrene-acrylic acid copolymer having a weight-average molecular weight of 8,000, an acid value of 140 mg KOH/g and a polydispersity Mw/Mn (Mw: weight-average molecular weight, Mn: number-average molecular weight) of 1.5 was then weighed to 190 g. To this copolymer 1,800 g of distilled water was added, potassium hydroxide necessary to neutralize the polymer was added, and stirring was conducted to dissolve the polymer, thereby preparing an aqueous solution of the styrene-acrylic acid copolymer. Then, 500 g of the dispersion liquid (2) was added dropwise into the aqueous solution of the styrene-acrylic acid copolymer obtained above under stirring. After this mixture of the dispersion liquid (2) and the aqueous solution of the styrene-acrylic acid copolymer was transferred to an evaporating dish, heated for 15 hours at 150° C. and dried, the resultant dried product was cooled to room temperature. The dried product obtained above was then added into distilled water whose pH was adjusted to 9.0 with potassium hydroxide and dispersed by means of a dispersing machine, and an aqueous potassium hydroxide solution was further added under stirring to adjust the pH of the liquid to 10.0 to 11.0. Thereafter, desalting and a purifying treatment were conducted to remove impurities and coarse particles. By the above-described process, Pigment Dispersion C in a state in which a carbon black in which a polymer whose counter ion was potassium was bonded to the surface thereof was dispersed in water was obtained. The content of the pigment in the Pigment Dispersion C was 10.0% by mass, the pH thereof was 10.0, and the average particle size of the pigment was 130 nm.

Preparation of Pigment Dispersion D

Twenty grams of Black Pearls 880 (product of Cabot) having a specific surface area of 220 m²/g, 3.9 mmol of sodium ((4-aminobenzoylamino)-methane-1,1-diyl)-bisphosphonate, 11.1 mmol of nitric acid and 200 mL of pure water were mixed at room temperature and 6,000 rpm by a Silverson mixer. After 30 minutes, a solution with 11.1 mmol of sodium nitrite dissolved in a small amount of water was added into this mixture, and mixing was further conducted. The mixing was conducted for 1 hour in a state in which the temperature had reached 60° C. by the addition and mixing. Thereafter, the pH of the mixture was adjusted to 10.0 with an aqueous potassium hydroxide solution. After 30 minutes, this mixture was subjected to ultrafiltration with 20 parts of pure water, and water was further added to disperse the pigment in such a manner that the content of the pigment is 10.0% by mass, thereby preparing Pigment Dispersion D. By the above-described process, Pigment Dispersion D in a state in which a self-dispersion carbon black in which a bisphosphonic acid group whose counter ion was potassium was bonded through an atomic group containing —C₆H₄—CONH— (benzamide structure) to the surface of the carbon black particle was dispersed in water was obtained. The surface charge amount of the self-dispersion pigment prepared above was measured as described above and was found to be 0.25 mmol/g. Incidentally, the pH of the Pigment Dispersion D prepared above was 10.0, and the average particle size of the pigment was 120 nm.

Preparation of Pigment Dispersion E

Pigment Dispersion E was prepared in the same manner as in Preparation of Pigment Dispersion D except that the addition amounts of sodium ((4-aminobenzoylamino)-methane-1,1-diyl)bisphosphonate, nitric acid and sodium nitrite were changed to 5.3 mmol, 15.1 mmol and 15.1 mmol, respectively. The content of the pigment in the Pigment Dispersion E was 10.0% by mass, the pH thereof was 10.0, the average particle size of the pigment was 120 nm, and the surface charge amount of the pigment was 0.34 mmol/g.

Preparation of Pigment Dispersion F

Pigment Dispersion F was prepared in the same manner as in Preparation of Pigment Dispersion D except that the addition amounts of sodium ((4-aminobenzoylamino)-methane-1,1-diyl)bisphosphonate, nitric acid and sodium nitrite were changed to 6.5 mmol, 18.7 mmol and 18.7 mmol, respectively. The content of the pigment in the Pigment Dispersion F was 10.0% by mass, the pH thereof was 10.0, the average particle size of the pigment was 120 nm, and the surface charge amount of the pigment was 0.42 mmol/g.

Preparation of Pigment Dispersion G

Pigment Dispersion G was prepared in the same manner as in Preparation of Pigment Dispersion D except that the addition amounts of sodium ((4-aminobenzoylamino)-methane-1,1-diyl)bisphosphonate, nitric acid and sodium nitrite were changed to 6.7 mmol, 19.1 mmol and 19.1 mmol, respectively. The content of the pigment in the Pigment Dispersion G was 10.0% by mass, the pH thereof was 10.0, the average particle size of the pigment was 120 nm, and the surface charge amount of the pigment was 0.43 mmol/g.

Preparation of Pigment Dispersion H

Pigment Dispersion H was prepared in the same manner as in Preparation of Pigment Dispersion D except that the addition amounts of sodium ((4-aminobenzoylamino)-methane-1,1-diyl)bisphosphonate, nitric acid and sodium nitrite were changed to 3.7 mmol, 10.7 mmol and 10.7 mmol, respectively. The content of the pigment in the Pigment Dispersion H was 10.0% by mass, the pH thereof was 10.0, the average particle size of the pigment was 120 nm, and the surface charge amount of the pigment was 0.24 mmol/g.

Preparation of Pigment Dispersion I

Cab-O-Jet 400 (product of Cabot) marketed as a self-dispersion carbon black in which a bisphosphonic acid group was bonded to the surface of the carbon black was diluted with water, and the resultant diluted product was sufficiently stirred to obtain Pigment Dispersion I. The content of the pigment in the Pigment Dispersion I was 10.0% by mass, the pH thereof was 9.0, the average particle size of the pigment was 130 nm, and the surface charge amount of the pigment was 0.19 mmol/g.

Preparation of Pigment Dispersion J

Cab-O-Jet 265M (product of Cabot) marketed as a self-dispersion carbon black in which a benzenesulfonic acid group was bonded to the surface of C.I. Pigment Red 122 was sufficiently stirred to obtain Pigment Dispersion J. The content of the pigment in the Pigment Dispersion J was 10.0% by mass, the pH thereof was 6.2, and the average particle size of the pigment was 105 nm.

Preparation of Polyurethane Polymer Dispersion:

A 4-necked flask equipped with a thermometer, a stirrer, a nitrogen inlet tube and a refluxing tube was charged with a polyisocyanate (A parts), a polyol (B parts) having no acid group, a diol (C parts) having an acid group and methyl ethyl ketone (300 parts) to conduct a reaction for 6 hours at 80° C. under a nitrogen gas atmosphere. Thereafter, a chain extender (D parts) was added to conduct a reaction at 80° C. until the presence of an isocyanate group was not identified by FT-IR. After an antioxidant shown in Table 1 was added after the reaction and stirring was sufficiently conducted, the resultant mixture was cooled to 40° C., ion-exchanged water was added, and an aqueous potassium hydroxide solution was added while stirring at high speed by a homomixer. Methyl ethyl ketone was distilled out of the resulting polymer solution by heating under reduced pressure to obtain a polyurethane polymer dispersion in which the content of the polymer was 20.0% by mass. The weight-average molecular weights of all polyurethane polymers obtained in this manner were more than 30,000 and 150,000 or less. The acid value of each of the resultant polyurethane polymers was measured by the above-described measuring method. Preparation conditions of each polyurethane polymer dispersion, the kind and content of the antioxidant, the content ratio of the polyurethane polymer to the antioxidant, and the acid value of the polyurethane polymer are shown in Table 1. Incidentally, IRGANOX 565, IRGANOX 3114, IRGANOX 1135, IRGANOX 1010, IRGANOX 1035 and IRGANOX 1076 are antioxidants produced by BASF. Abbreviations in Table 1 are as follows.

IPDI: Isophorone diisocyanate
HMDI: Dicyclohexylmethane-4,4'-diisocyanate
HDI: Hexamethylenediisocyanate
PPG: Polypropylene glycol (number-average molecular weight: 2,000)
PTMG: Polytetramethylene glycol (number-average molecular weight: 2,000)
PC: Polycarbonate polyol (number-average molecular weight: 2,000)
PES: Polyester polyol (number-average molecular weight: 2,000)
DMPA: Dimethylolpropionic acid
EDA: Ethylenediamine
NPG: Neopentyl glycol
BHT: Dibutylhydroxytoluene.

TABLE 1

Preparation conditions of polyurethane (PU) polymer dispersion

| PU polymer dispersion No. | Polyisocyanate Kind | A (parts) | Polyol having no acid group Kind | B (parts) | Diol having an acid group Kind | C (parts) | Chain extender Kind | D (parts) | Acid value of PU polymer (mg KOH/g) | Antioxidant Kind | Content (% by ness) | Content ratio of antioxidant/ PU polymer (times) |
|---|---|---|---|---|---|---|---|---|---|---|---|---|
| PU-1  | IPDI | 46.9 | PPG  | 31.6 | DMPA | 21.5 | EDA | 2.1 | 90  | IRGANOX 1135 | 0.02 | 0.001 |
| PU-2  | IPDI | 46.9 | PTMG | 31.6 | DMPA | 21.5 | EDA | 2.1 | 90  | IRGANOX 1135 | 0.02 | 0.001 |
| PU-3  | IPDI | 46.9 | PPG  | 31.6 | DMPA | 21.5 | EDA | 2.1 | 90  | IRGANOX 3114 | 0.02 | 0.001 |
| PU-4  | IPDI | 46.9 | PPG  | 31.6 | DMPA | 21.5 | EDA | 2.1 | 90  | IRGANOX 565  | 0.02 | 0.001 |
| PU-5  | IPDI | 27.5 | PPG  | 61.7 | DMPA | 9.6  | EDA | 1.3 | 40  | IRGANOX 1135 | 0.20 | 0.010 |
| PU-6  | IPDI | 61.5 | PPG  | 5.0  | DMPA | 33.5 | EDA | 1.5 | 140 | IRGANOX 1135 | 0.20 | 0.010 |
| PU-7  | IPDI | 46.9 | PPG  | 31.6 | DMPA | 21.5 | EDA | 2.1 | 90  | IRGANOX 1135 | 0.10 | 0.005 |
| PU-8  | IPDI | 46.9 | PPG  | 31.6 | DMPA | 21.5 | EDA | 2.1 | 90  | IRGANOX 1135 | 0.20 | 0.010 |
| PU-9  | IPDI | 46.9 | PPG  | 31.6 | DMPA | 21.5 | EDA | 2.1 | 90  | IRGANOX 1135 | 1.00 | 0.050 |
| PU-10 | IPDI | 46.9 | PPG  | 31.6 | DMPA | 21.5 | EDA | 2.1 | 90  | IRGANOX 1135 | 1.20 | 0.060 |
| PU-11 | HMDI | 54.1 | PPG  | 22.3 | DMPA | 21.5 | EDA | 2.1 | 90  | IRGANOX 1135 | 0.20 | 0.010 |
| PU-12 | HDI  | 36.2 | PPG  | 40.2 | DMPA | 21.5 | EDA | 2.1 | 90  | IRGANOX 1135 | 0.20 | 0.010 |
| PU-13 | IPDI | 46.5 | PPG  | 28.3 | DMPA | 21.5 | NPG | 3.6 | 90  | IRGANOX 1135 | 0.20 | 0.010 |
| PU-14 | IPDI | 46.9 | PES  | 31.6 | DMPA | 21.5 | EDA | 2.1 | 90  | IRGANOX 1135 | 0.20 | 0.010 |
| PU-15 | IPDI | 46.9 | PC   | 31.6 | DMPA | 21.5 | EDA | 2.1 | 90  | IRGANOX 1135 | 0.20 | 0.010 |
| PU-16 | IPDI | 29.7 | PPG  | 58.9 | DMPA | 9.3  | EDA | 2.1 | 39  | IRGANOX 1135 | 0.20 | 0.010 |
| PU-17 | IPDI | 63.6 | PPG  | 0.6  | DMPA | 33.7 | EDA | 2.1 | 141 | IRGANOX 1135 | 0.20 | 0.010 |
| PU-18 | IPDI | 46.9 | PPG  | 31.6 | DMPA | 21.5 | EDA | 2.1 | 90  | IRGANOX 1010 | 0.20 | 0.010 |
| PU-19 | IPDI | 46.9 | PPG  | 31.6 | DMPA | 21.5 | EDA | 2.1 | 90  | IRGANOX 1035 | 0.20 | 0.010 |
| PU-20 | IPDI | 46.9 | PPG  | 31.6 | DMPA | 21.5 | EDA | 2.1 | 90  | IRGANOX 1076 | 0.20 | 0.010 |
| PU-21 | IPDI | 46.9 | PPG  | 31.6 | DMPA | 21.5 | EDA | 2.1 | 90  | BHT          | 0.20 | 0.010 |
| PU-22 | IPDI | 46.9 | PPG  | 31.6 | DMPA | 21.5 | EDA | 2.1 | 90  | —            | 0    | 0     |

Preparation of Aqueous Acrylic Polymer Solution:

An acid group of an acrylic polymer (random copolymer) having its corresponding composition and properties shown in Table 2 was neutralized with a 10.0% by mass aqueous sodium hydroxide solution, and water was further added to prepare an aqueous solution of the acrylic polymer whose polymer content was 10.0% by mass. Incidentally, the acid value and weight-average molecular weight (Mw) of the acrylic polymer were measured by the above-described respective measuring methods.

TABLE 2

Composition and properties of aqueous acrylic polymer solution

| Aqueous acrylic polymer solution No. | Composition (% by mass) | | | | | Acid value (mg KOH/g) | Mw |
| | Styrene | Butyl acrylate | Benzyl methacrylate | Methacrylic acid | Acrylic acid | | |
|---|---|---|---|---|---|---|---|
| Polymer solution A | 60.0 | 26.0 | —    | 14.0 | —    | 90  | 10000 |
| Polymer solution B | 67.0 | 20.0 | —    | —    | 13.0 | 100 | 10000 |
| Polymer solution C | 36.0 | —    | 38.0 | —    | 26.0 | 200 | 10000 |
| Polymer solution D | —    | 22.0 | 51.0 | —    | 27.0 | 210 | 10000 |

Preparation of Ink:
Preparation of Inks 1 to 40

The above-obtained pigment dispersions, polyurethane polymer dispersions and aqueous acrylic polymer solutions were mixed with the following respective components in the combinations shown in Table 3. Incidentally, the balance of ion-exchanged water means such an amount that the total amount of all the components constituting an ink amounts to 100.0% by mass.

| | |
|---|---|
| Pigment dispersion (pigment content: 10.0% by mass) | 30.0% by mass |
| Polyurethane polymer dispersion (polymer content: 20.0% by mass) | 6.0% by mass |
| Aqueous acrylic polymer solution (polymer content: 10.0% by mass) | see Table 3 |
| Polyethylene glycol | see Table 3 |
| Glycerol | 9.0% by mass |
| Diethylene glycol | 5.0% by mass |
| Triethylene glycol | 5.0% by mass |
| Acetylenol E100 (surfactant, product of Kawaken Fine Chemicals Co., Ltd.) | 0.2% by mass |
| Ion-exchanged water | Balance. |

After these respective components were sufficiently stirred and dispersed, the resultant dispersion liquids were filtered under pressure through a microfilter (product of Fuji Photo Film Co., Ltd.) having a pore size of 3.0 μm to prepare respective inks.

TABLE 3

Preparation conditions of ink

| Ink No. | Pigment dispersion No. | PU polymer dispersion No. | Aqueous acrylic polymer solution No. | Polyethylene glycol Content (% by mass) | Number-average molecular weight | Content (% by mass) |
|---|---|---|---|---|---|---|
| Ink 1 | A | PU-1 | — | 0   | —    | 0   |
| Ink 2 | A | PU-2 | — | 0   | —    | 0   |
| Ink 3 | A | PU-3 | — | 0   | —    | 0   |
| Ink 4 | A | PU-4 | — | 0   | —    | 0   |
| Ink 5 | E | PU-5 | B | 6.0 | 1000 | 1.0 |
| Ink 6 | E | PU-6 | B | 6.0 | 1000 | 1.0 |
| Ink 7 | B | PU-1 | — | 0   | —    | 0   |

TABLE 3-continued

| | | | Preparation conditions of ink | | | |
|---|---|---|---|---|---|---|
| | | | | Aqueous acrylic polymer solution | Polyethylene glycol | |
| Ink No. | Pigment dispersion N0. | PU polymer dispersion No. | No. | Content (% by mass) | Number-average molecular weight | Content (% by mass) |
| Ink 8 | C | PU-1 | — | 0 | — | 0 |
| Ink 9 | I | PU-1 | — | 0 | — | 0 |
| Ink 10 | G | PU-1 | — | 0 | — | 0 |
| Ink 11 | H | PU-1 | — | 0 | — | 0 |
| Ink 12 | D | PU-1 | — | 0 | — | 0 |
| Ink 13 | E | PU-1 | — | 0 | — | 0 |
| Ink 14 | F | PU-1 | — | 0 | — | 0 |
| Ink 15 | E | PU-7 | — | 0 | — | 0 |
| Ink 16 | E | PU-8 | — | 0 | — | 0 |
| Ink 17 | E | PU-9 | — | 0 | — | 0 |
| Ink 18 | E | PU-10 | B | 6.0 | — | 0 |
| Ink 19 | E | PU-8 | A | 6.0 | — | 0 |
| Ink 20 | E | PU-8 | B | 6.0 | — | 0 |
| Ink 21 | E | PU-8 | C | 6.0 | — | 0 |
| Ink 22 | E | PU-8 | D | 6.0 | — | 0 |
| Ink 23 | E | PU-8 | B | 6.0 | 400 | 1.0 |
| Ink 24 | E | PU-8 | B | 6.0 | 500 | 1.0 |
| Ink 25 | E | PU-8 | B | 6.0 | 1000 | 1.0 |
| Ink 26 | E | PU-8 | B | 6.0 | 3000 | 1.0 |
| Ink 27 | E | PU-8 | B | 6.0 | 4000 | 1.0 |
| Ink 28 | E | PU-11 | B | 6.0 | 1000 | 1.0 |
| Ink 29 | E | PU-12 | B | 6.0 | 1000 | 1.0 |
| Ink 30 | E | PU-13 | B | 6.0 | 1000 | 1.0 |
| Ink 31 | J | PU-8 | B | 6.0 | 1000 | 1.0 |
| Ink 32 | E | PU-14 | B | 6.0 | 1000 | 1.0 |
| Ink 33 | E | PU-15 | B | 6.0 | 1000 | 1.0 |
| Ink 34 | E | PU-16 | B | 6.0 | 1000 | 1.0 |
| Ink 35 | E | PU-17 | B | 6.0 | 1000 | 1.0 |
| Ink 36 | E | PU-18 | B | 6.0 | 1000 | 1.0 |
| Ink 37 | E | PU-19 | B | 6.0 | 1000 | 1.0 |
| Ink 38 | E | PU-20 | B | 6.0 | 1000 | 1.0 |
| Ink 39 | E | PU-21 | B | 6.0 | 1000 | 1.0 |
| Ink 40 | E | PU-22 | B | 6.0 | 1000 | 1.0 |

Preparation of Ink 41

An ink was prepared as Ink 41 according to Example 1 of Patent Literature 2 (Japanese Patent Application Laid-Open No. 2009-287014).

Evaluation:

In the present invention, in the evaluation criteria of the following respective evaluation items, AA to B were regarded as a favorable level, and C and D were regarded as an unacceptable level. Incidentally, each of the following evaluations were made by using in an ink jet recording apparatus PIXUS iP3100 (manufactured by Canon Inc.) in which an ink is ejected from a recording head by the action of thermal energy. Recording was conducted under the conditions of a temperature of 23° C., a relative humidity of 55% and an ejection amount per drop of 28 ng (within ±10%). In the ink jet recording apparatus, an image recorded under the conditions that resolution is 600 dpi×600 dpi and about 28 ng of an ink droplet is applied to a unit region of $\frac{1}{600}$ inch×$\frac{1}{600}$ inch is defined as a recording duty of 100%.

Fastness of Image

Each ink obtained above was charged into an ink cartridge, and the ink cartridge was installed in the ink jet recording apparatus. A vertical ruled line having a line thickness of $\frac{1}{10}$ inch was then recorded on PPC paper GF-500 (product of Canon Inc.). After 5 minutes from the recording, the resultant vertical ruled line was marked with a yellow highlighter OPTEX 2 (product of ZEBRA) to observe stain of the marked portion. Upon evaluation of the fastness of the image, sample images A to C corresponding to the following evaluation criteria were prepared. The evaluation of the fastness of the image was then visually made by determining the closest image of the sample images A to C. Specifically, when the evaluated image was closest to the sample image A, it was ranked as A. Evaluation results are shown in Table 4.

A: The marked portion was not stained at all;
B: The marked portion was scarcely stained;
C: The marked portion was markedly stained.

Change in Fastness of Image Upon Long-Term Storage of Ink

The image after the marking test was conducted in the above-described evaluation (fastness of image) was regarded as an image subjected to the marking test before storage. Each ink obtained above was then stored under condition 1 (for 10 days at 70° C.) and condition 2 (for 20 days at 70° C.), and a marking test was conducted in the same manner as described above (in the fastness of image) to obtain an image subjected to the marking test after storage. As to the respective storage conditions of the ink, the images subjected to the marking test before and after the long-term storage were visually observed, thereby making evaluation as to change in the fastness of the image upon the long-term storage of the ink. The evaluation criteria are as follows. Evaluation results are shown in Table 4.

AA: No change was observed in the stain of the marked portions of the images subjected to the marking test before and after the storage;

A: Slight change was observed in the stain of the marked portions of the images subjected to the marking test before and after the storage;

B: Change was observed in the stain of the marked portions of the images subjected to the marking test before and after the storage, but it was an inconspicuous level;

C: The marked portion of the image subjected to the marking test after the storage was obviously stained compared with the image before the storage;

D: The marked portion of the image subjected to the marking test after the storage was markedly stained compared with the image before the storage.

Ejection Stability of Ink

Each ink obtained above was charged into an ink cartridge, and the ink cartridge was installed in the above-described ink jet recording apparatus modified in such manner that the scanning speed of a carriage was 40 inch/sec. An image (image before an ejection test) of a vertical ruled line formed by 4 dots was then recorded on PPC paper GF-500 (product of Canon Inc.). After a solid image (image having a recording duty of 100%) of 19 cm×26 cm was recorded on 10 sheets of the paper, an image (image after the ejection test) of a vertical ruled line formed by 4 dots was recorded again. As to the images before and after the ejection test, raggedness values of the vertical ruled lines were respectively determined by means of a personal image quality analysis system Personal IAS (manufactured by Quality Engineering Associates), and the images of the vertical ruled lines were further visually observed to evaluate the ink as to ejection stability. Incidentally, the smaller the difference between the raggedness values of the vertical ruled lines before and after the ejection test, the higher the ejection stability of the ink. A heater board of the recording head was observed through an optical microscope after the test, thereby observing whether kogation occurred or not. The evaluation criteria as to the ejection stability of the ink are as follows. Evaluation results are shown in Table 4.

AA: The difference in raggedness value between before and after the ejection test is less than 2, no change was observed in the images of the vertical ruled lines, and kogation did not occur at all;

A: The difference in raggedness value between before and after the ejection test is less than 2, no change was observed in the images of the vertical ruled lines, but kogation slightly occurred;

B: The difference in raggedness value between before and after the ejection test is 2 or more, change was slightly observed in the images of the vertical ruled lines, but it was an inconspicuous level, and kogation occurred to the extent that it is not deposited;

C: White stripe or blur was observed in the solid image upon the ejection test;

D: Ejection became infeasible upon the ejection test.

TABLE 4

Evaluation results

| Example No. | Ink No. | Fastness of image | Change in fastness of image upon long-term storage of ink | | Ejection stability of ink |
|---|---|---|---|---|---|
| | | | Condition 1 | Condition 2 | |
| Ex. 1 | Ink 1 | B | B | B | B |
| Ex. 2 | Ink 2 | B | B | B | B |
| Ex. 3 | Ink 3 | B | B | B | B |
| Ex. 4 | Ink 4 | B | B | B | B |
| Ex. 5 | Ink 5 | B | AA | AA | AA |
| Ex. 6 | Ink 6 | B | AA | AA | AA |
| Ex. 7 | Ink 7 | B | A | B | B |
| Ex. 8 | Ink 8 | B | A | B | B |
| Ex. 9 | Ink 9 | B | A | A | B |
| Ex. 10 | Ink 10 | B | A | A | B |
| Ex. 11 | Ink 11 | B | A | A | B |
| Ex. 12 | Ink 12 | B | AA | A | B |
| Ex. 13 | Ink 13 | B | AA | A | B |
| Ex. 14 | Ink 14 | B | AA | A | B |
| Ex. 15 | Ink 15 | B | AA | AA | B |
| Ex. 16 | Ink 16 | B | AA | AA | B |
| Ex. 17 | Ink 17 | B | AA | AA | B |
| Ex. 18 | Ink 18 | B | AA | AA | B |
| Ex. 19 | Ink 19 | B | AA | AA | B |
| Ex. 20 | Ink 20 | B | AA | AA | A |
| Ex. 21 | Ink 21 | B | AA | AA | A |
| Ex. 22 | Ink 22 | B | AA | AA | B |
| Ex. 23 | Ink 23 | B | AA | AA | A |
| Ex. 24 | Ink 24 | B | AA | AA | AA |
| Ex. 25 | Ink 25 | B | AA | AA | AA |
| Ex. 26 | Ink 26 | B | AA | AA | AA |
| Ex. 27 | Ink 27 | B | AA | AA | A |
| Ex. 28 | Ink 28 | B | AA | AA | AA |
| Ex. 29 | Ink 29 | B | AA | AA | AA |
| Ex. 30 | Ink 30 | B | AA | AA | AA |
| Comp. Ex 1 | Ink 31 | B | C | D | AA |
| Comp. Ex 2 | Ink 32 | C | C | C | AA |
| Comp. Ex 3 | Ink 33 | C | AA | AA | AA |
| Comp. Ex 4 | Ink 34 | B | AA | AA | C |
| Comp. Ex 5 | Ink 35 | C | AA | AA | AA |
| Comp. Ex 6 | Ink 36 | B | AA | AA | D |
| Comp. Ex 7 | Ink 37 | B | C | C | D |
| Comp. Ex 8 | Ink 38 | B | AA | AA | D |
| Comp. Ex 9 | Ink 39 | B | AA | AA | D |
| Comp. Ex 10 | Ink 41 | C | C | D | C |
| Ref. Ex. 1 | Ink 40 | B | C | C | AA |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-107783, filed May 9, 2012, which is hereby incorporated by reference herein in its entirety.

What is claimed is:

1. An ink comprising:

a polyurethane polymer that has units respectively derived from a polyisocyanate, a polyether polyol having no acid group, and a diol having an acid group, and has an acid value of from 40 mg KOH/g to 140 mg KOH/g, the polyurethane polymer having a non-crosslinked structure;

a carbon black; and at least one antioxidant selected from the group consisting of a compound represented by the following general formula (1), a compound represented by the following general formula (2) and a compound represented by the following general formula (3):

General formula (1)

wherein $R_1$ is an alkyl group having 1 to 20 carbon atoms;

General formula (2)

wherein $R_2$ is a methylene group or an ethylene group; and

General formula (1)

wherein $R_1$ is an alkyl group having 1 to 20 carbon atoms;

General formula (2)

wherein $R_2$ is a methylene group or an ethylene group; and

General formula (3)

wherein $R_3$ is an alkyl group having 1 to 16 carbon atoms.

2. The ink according to claim 1, wherein the carbon black is a self-dispersion carbon black.

3. The ink according to claim 2, wherein the self-dispersion carbon black is a self-dispersion carbon black in which a phosphonic acid group is bonded directly or through another atomic group to a surface thereof.

4. The ink according to claim 3, wherein a surface charge amount of the self-dispersion carbon black in which the phosphonic acid group is bonded directly or through another atomic group to the surface thereof is from 0.25 mmol/g to 0.42 mmol/g.

5. The ink according to claim 1, wherein a content (% by mass) of the antioxidant based on the total mass of the ink is from $5.0 \times 10^{-3}$ times to $5.0 \times 10^{-2}$ times in terms of mass ratio with respect to a content (% by mass) of the polyurethane polymer.

6. The ink according to claim 1, which further comprises an acrylic polymer having an acid value of from 100 mg KOH/g to 200 mg KOH/g.

7. The ink according to claim 1, which further comprises polyethylene glycol having a number-average molecular weight of from 500 to 3,000.

8. The ink according to claim 1, which is used in an ink jet recording method in which an ink is ejected from a recording head by the action of thermal energy.

9. An ink cartridge comprising an ink storage portion storing an ink, wherein the ink stored in the ink storage portion is the ink according to claim 1.

10. The ink according to claim 1, wherein the polyisocyanate is isophorone diisocyanate, the polyether polyol having no acid group is polytetramethylene glycol, and the diol having an acid group is dimethylolpropionic acid.

11. The ink according to claim 1, wherein the polyisocyanate is isophorone diisocyanate, the polyether polyol having no acid group is polyester polyol, and the diol having an acid group is dimethylolpropionic acid.

12. The ink according to claim 1, wherein the polyisocyanate is isophorone diisocyanate, the polyether polyol having no acid group is polycarbonate polyol, and the diol having an acid group is dimethylolpropionic acid.

13. An ink jet recording method comprising ejecting an ink from a recording head by the action of thermal energy, wherein the ink comprises:
a polyurethane polymer that has units respectively derived from a polyisocyanate, a polyether polyol having no acid group, and a diol having an acid group, and has an acid value of from 40 mg KOH/g to 140 mg KOH/g, the polyurethane polymer having a non-crosslinked structure;
a carbon black; and
at least one antioxidant selected from the group consisting of a compound represented by the following general formula (1), a compound represented by the following general formula (2) and a compound represented by the following general formula (3):

General formula (3)

wherein $R_3$ is an alkyl group having 1 to 16 carbon atoms.

14. The ink according to claim 1, wherein the polyisocyanate is isophorone diisocyanate, the polyether polyol having no acid group is polypropylene glycol, and the diol having an acid group is dimethylolpropionic acid.

15. The ink according to claim 13, wherein the polyisocyanate is isophorone diisocyanate, the polyether polyol having no acid group is polypropylene glycol, and the diol having an acid group is dimethylolpropionic acid.

16. The ink according to claim 13, wherein the polyisocyanate is isophorone diisocyanate, the polyether polyol having no acid group is polytetramethylene glycol, and the diol having an acid group is dimethylolpropionic acid.

17. The ink according to claim 13, wherein the polyisocyanate is isophorone diisocyanate, the polyether polyol having no acid group is polyester polyol, and the diol having an acid group is dimethylolpropionic acid.

18. The ink according to claim 13, wherein the polyisocyanate is isophorone diisocyanate, the polyether polyol having no acid group is polycarbonate polyol, and the diol having an acid group is dimethylolpropionic acid.

* * * * *